Aug. 5, 1924.

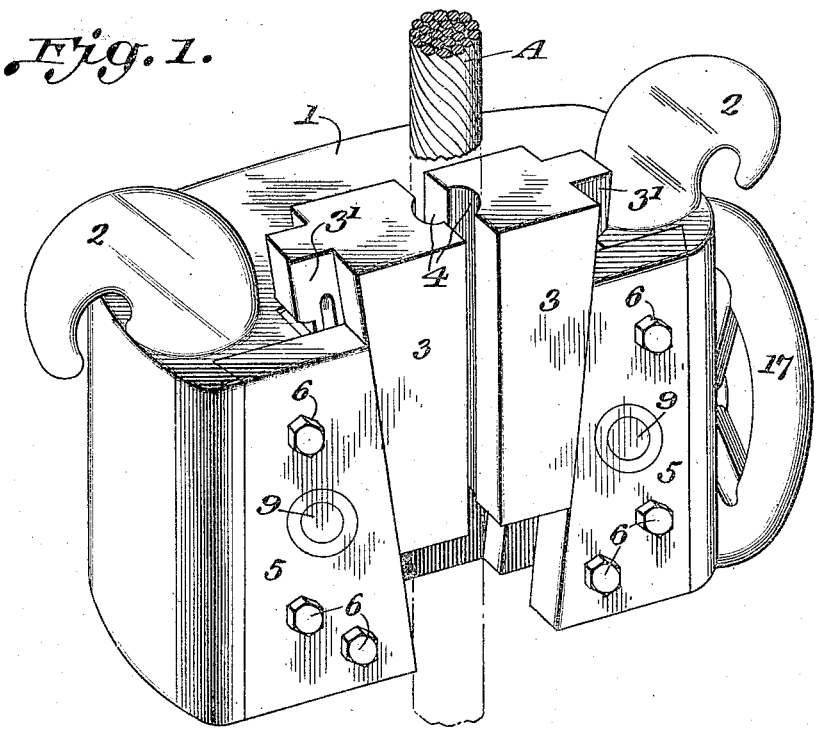
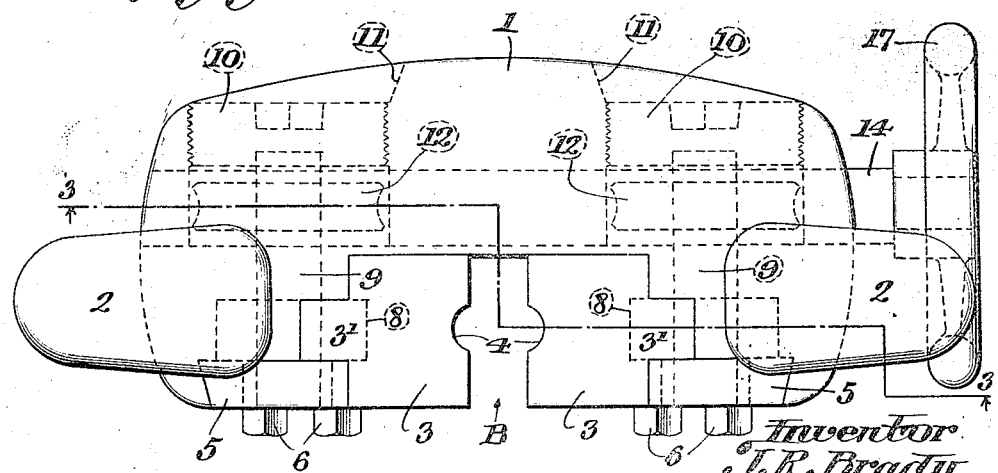

J. R. BRADY

WIRE LINE CLAMP

Filed Jan. 5, 1924   2 Sheets-Sheet 2

1,504,087

Inventor
J. R. Brady
by his Attorneys

Patented Aug. 5, 1924.

1,504,087

UNITED STATES PATENT OFFICE.

JUDSON ROY BRADY, OF ARKANSAS CITY, KANSAS.

WIRE-LINE CLAMP.

Application filed January 5, 1924. Serial No. 684,521.

*To all whom it may concern:*

Be it known that I, JUDSON R. BRADY, a citizen of the United States, and resident of Arkansas City, in the county of Cowley and State of Kansas, have invented certain new and useful Improvements in Wire-Line Clamps, of which the following is a specification.

The invention relates to clamps for cables and is particularly adapted for use with drilling lines of wire, although it may be employed wherever it is desired to firmly grip a rope or cable of wire or other material.

An object of the invention is the provision of a form of clamp which will grip the cable or line firmly throughout a considerable extent and with a greater force than is readily obtainable in the usual form of such devices.

Another object is to provide a clamp in which the pull on the line in use will tend to tighten the pressure exerted by the clamp.

Another object is to provide a clamp that can be readily applied and removed and which will be simple and efficient in its operation.

Other objects will be apparent from the following detailed description and appended claims.

In the drawings:—

Figure 1 is a side elevation of the clamp showing the position of the cable when in use.

Figure 2 is a top plan view of the clamp.

Figure 3:
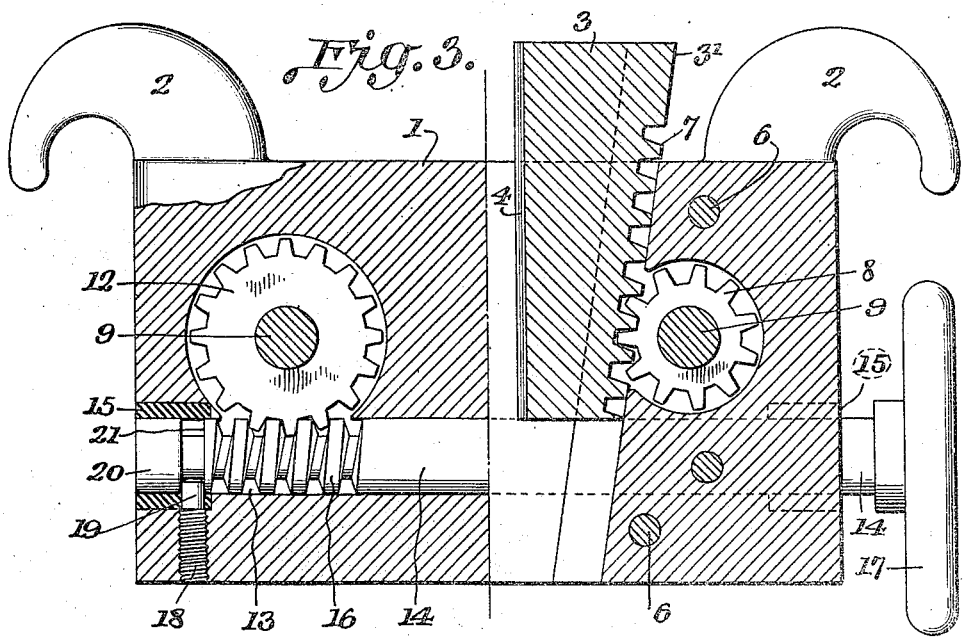
Figure 3 is a section taken on the line 3—3 of Figure 2.
Figure 4:
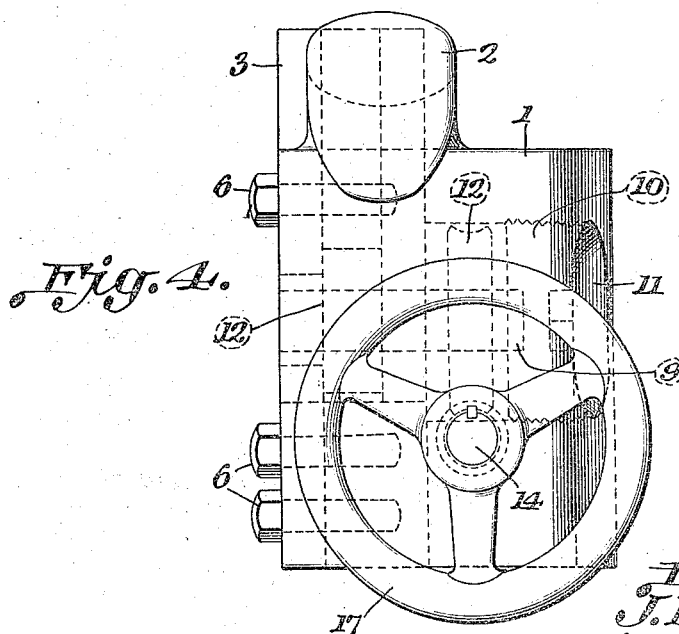
Figure 4 is a side elevation.

The clamp comprises a body 1 having integral hook projections 2 adapted to receive connections from the temper screw or other supporting means. One side of the body has a wedge shaped cut-out in which slide wedge clamping members 3 having circular longitudinal grooves 4 adapted to engage the cable A. These members 3 are held against accidental displacement sidewise by plate members 5 which are fastened to the body 1 by headed cap screws 6 or in some similar manner. The outer edge of each wedge member is provided with a rib 3′ having a rack 7.

Meshing with each rack 7 is a gear 8 on a shaft 9 having a bearing at one end in the plate member 5 and at the other end in a bearing member 10 threaded into a recess 11 in the body. Each shaft 9 also carries a worm gear 12. Mounted in a bore 13 extending through the body at right angles to the shafts 9 is a shaft 14 having its ends mounted in bearings 15 and provided with worms 16 meshing with the worm gears 12. This shaft is provided with a wheel 17 or handle at one end for turning the same and is held against longitudinal movement by a set screw 18 having a round pivot inner end 19 engaging in a groove between the enlarged outer end 20 of the shaft, and a circular face at the end of the worm.

By turning the hand wheel 17 as desired the worms, one of which is right handed and the other left handed, will rotate the two shafts 9 in opposite directions thus turning the gears 8 which mesh with the racks 7 and moving the sliding wedge members 3 out far enough so that the cable can be passed in through the space B. Then by turning the hand wheel in the opposite direction the wedge members will be forced downward causing the circular portions 4 to clamp the cable tightly. The worms will hold the wedges against accidental displacement, but the downward pull on the cable will tend to pull the clamps downward, thus tightening the same. The clamp can be quickly applied and removed, and the gripping force can be regulated more easily than with previous forms. It is also possible to obtain a very high pressure upon the cable and hold it firmly even though it is under great tension. Cables of different sizes and different materials may be held by the device without modification. In some instances only one movable wedge member 3 need be employed.

Although primarily adapted for use in drilling operations, it is evident that it can be employed wherever it is desired to grip a cable firmly. It is also obvious that various detail changes may be made without departing from the spirit of the invention which is to be regarded as limited only by the terms of the appended claims.

I claim as my invention:

1. A wire clamp comprising a body, slidably mounted clamping jaws carried thereby, a rack on each of said jaws, shafts carrying pinions meshing with said racks, worm gears on said shafts, and an operating shaft having worms meshing with said worm gears.

2. A wire clamp comprising a body, a pair of opposed wedge shaped clamping members slidably mounted therein, a rack on each of said members, shafts carrying pinions meshing with said racks, and means for rotating said pinions to move said members simultaneously to and from clamping position.

3. A wire clamp comprising a body, a plurality of opposed wedge shaped clamping members mounted to slide therein, a rack on each of said members, shafts carrying pinions meshing with said racks, and means for rotating said pinions simultaneously comprising worm gearing.

4. A wire clamp comprising a body having a wedge shaped opening therein, a pair of opposed wedge shaped clamps having clamping faces and mounted to slide in said body, and gear mechanism for moving said clamps longitudinally in said opening and thereby to or from clamping position.

5. A wire clamp comprising a body having a wedge shaped opening therein, a wedge shaped clamp mounted to slide in said opening, a rib on the back of said clamp, a gear on said rib, a pinion meshing with said gear, and means comprising a worm gear for operating said pinion and thereby moving the clamp to and from operative position.

6. A wire clamp comprising a body, two slidably mounted clamp members carried thereby, the sliding of said clamps causing their opposed faces to approach or recede, and gearing including a worm for sliding said clamps simultaneously.

7. A wire clamp comprising a body, slidably mounted clamp members carried thereby, means whereby the operative faces of the clamp members approach each other on movement in one direction and recede from each other on movement in the other direction, a gear on each of said members, and means including worm gearing for sliding said members simultaneously and locking them in adjusted position.

8. A wire clamp comprising a body, clamp members mounted to slide therein, means whereby the sliding movement causes the clamps to approach or recede, and means for sliding said clamp members simultaneously.

In testimony whereof, I have hereunto subscribed my name.

JUDSON ROY BRADY.